United States Patent [19]

Keeley et al.

[11] Patent Number: 4,768,148

[45] Date of Patent: Aug. 30, 1988

[54] READ IN PROCESS MEMORY APPARATUS

[75] Inventors: James W. Keeley, Nashua, N.H.; George J. Barlow, Tewksbury, Mass.

[73] Assignee: Honeywell Bull Inc., Waltham, Mass.

[21] Appl. No.: 879,856

[22] Filed: Jun. 27, 1986

[51] Int. Cl.⁴ .................... G06F 13/00; G11C 7/00
[52] U.S. Cl. ............................................. 364/200
[58] Field of Search ... 364/200 MS File, 900 MS File

[56] References Cited

U.S. PATENT DOCUMENTS

| 4,084,234 | 4/1978 | Calle et al. | 364/200 |
|---|---|---|---|
| 4,156,906 | 5/1979 | Ryan | 364/200 |
| 4,161,024 | 7/1979 | Joyce et al. | 364/200 |
| 4,245,304 | 1/1981 | Porter et al. | 364/200 |
| 4,314,331 | 2/1982 | Porter et al. | 364/200 |
| 4,349,874 | 9/1982 | Woods et al. | 364/200 |
| 4,415,970 | 11/1983 | Swenson et al. | 364/200 |
| 4,445,174 | 4/1984 | Fletcher | 364/200 |
| 4,472,774 | 9/1984 | Pilat et al. | 364/200 |
| 4,580,240 | 4/1986 | Watanabe | 364/900 |

OTHER PUBLICATIONS

IBM Tech. Disclosure Bulletin, vol. 21, No. 6, Nov. 1978 "Data Processing System with Second Level Cache", pp. 2468-2469; by F. J. Sparacio.

*Primary Examiner*—Gareth D. Shaw
*Assistant Examiner*—Joseph T. FitzGerald
*Attorney, Agent, or Firm*—Faith F. Driscoll; John S. Solakian

[57] ABSTRACT

A cache memory subsystem couples to main memory through interface circuits via a system bus in common with a plurality of central processing subsystems which have similar interface circuits. The cache memory subsystem includes multilevel directory memory and buffer memory pipeline stages shareable by at least a pair of processing units. A read in process (RIP) memory associated with the buffer memory stage is set to a predetermined state in response to each read request which produces a miss condition to identify the buffer memory location of a specific level in the buffer memory which has been preallocated. The contents of the buffer memory stage are maintained coherent with main memory by updating its contents in response to write requests applied to the system bus by other subsystems. Upon detecting the receipt of data prior to the receipt of the requested data which would make the buffer memory contents incoherent, the cache switches the state of control means associated with the RIP memory. Upon receipt of the requested data, the directory memory is accessed, the RIP memory is reset and the latest data is forwarded to the requesting processing unit as a function of the state of the control means.

29 Claims, 6 Drawing Sheets

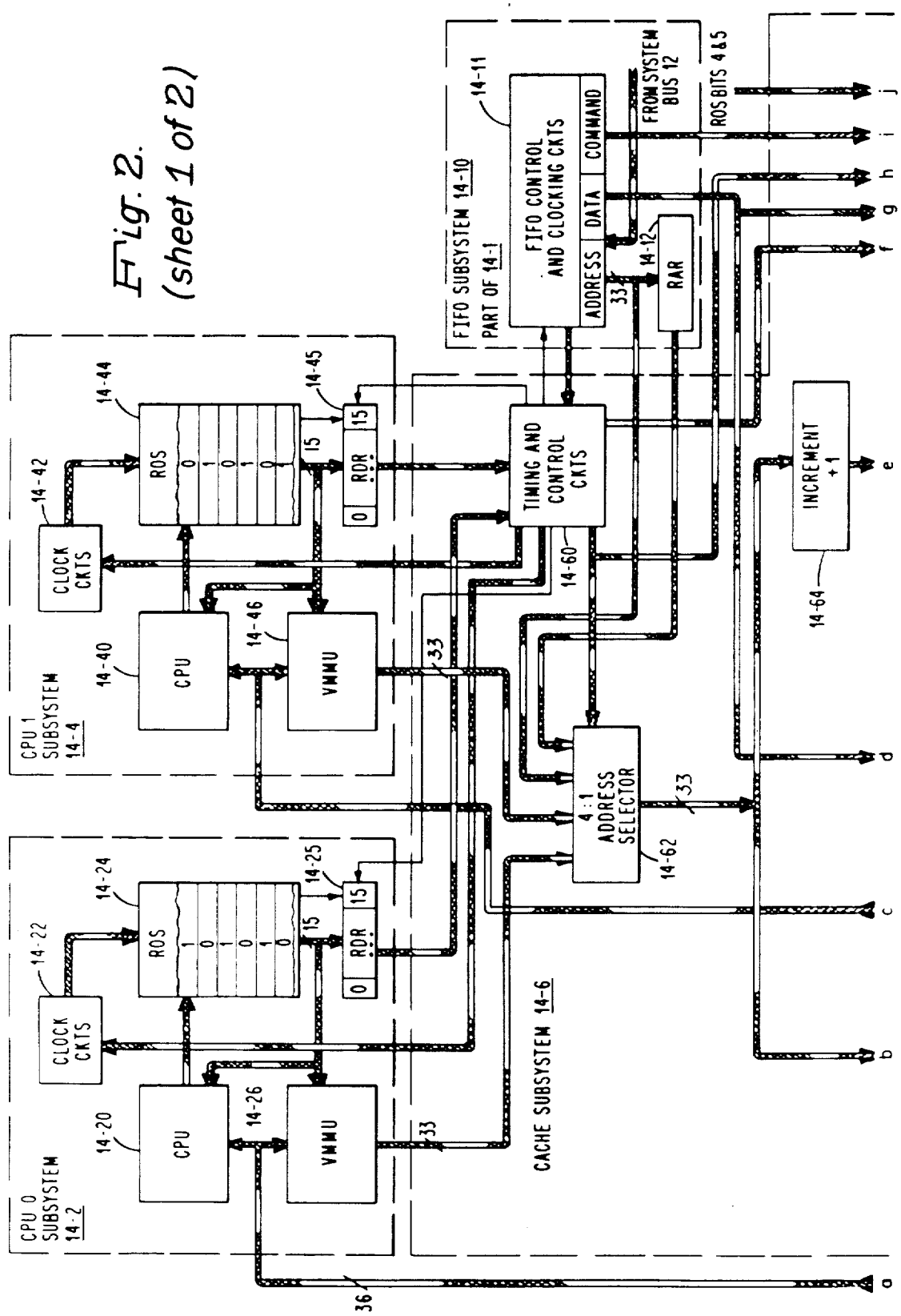
Fig. 2. (sheet 1 of 2)

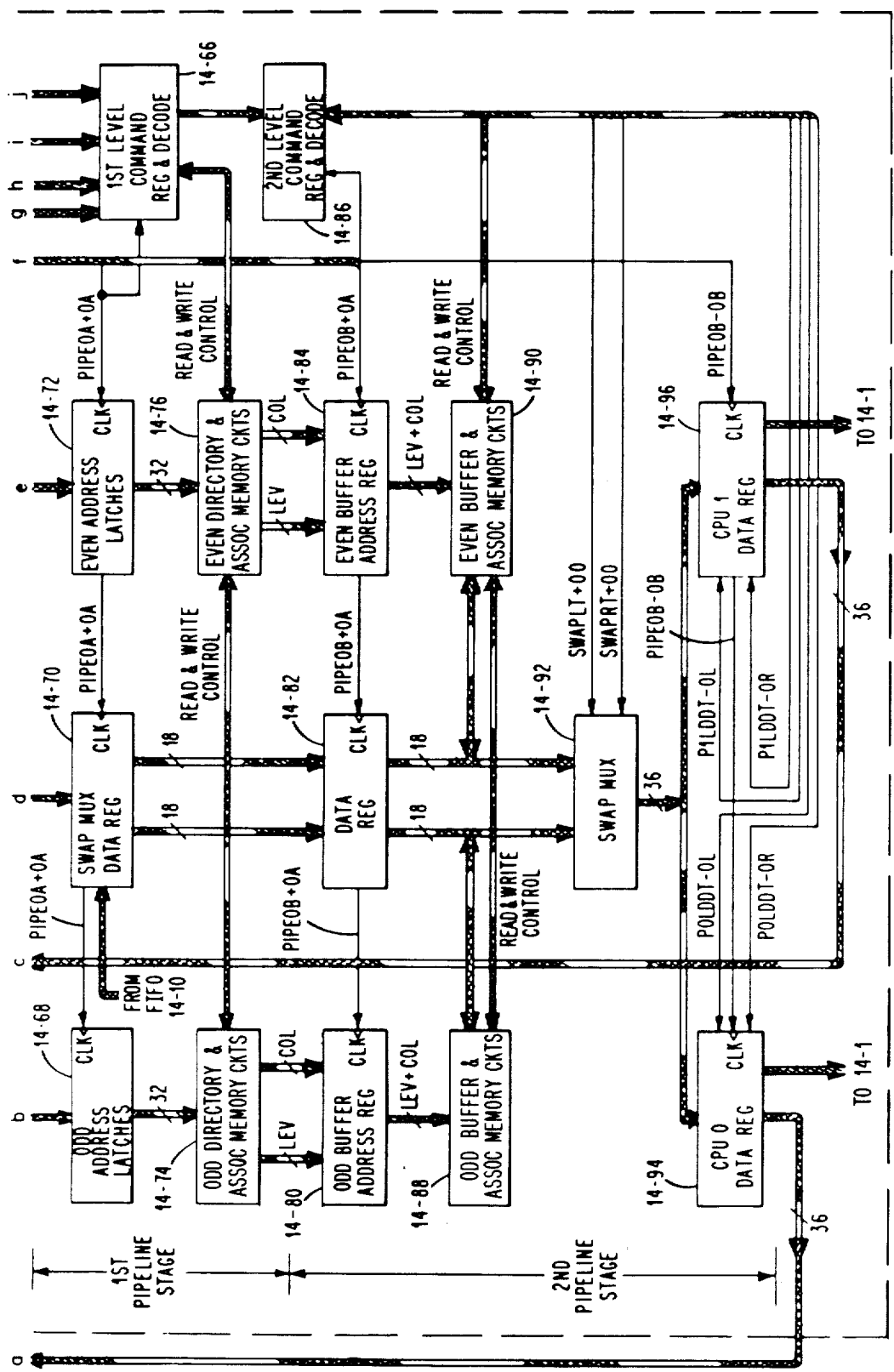
Fig. 2. (sheet 2 of 2)

READ IN PROCESS MEMORY APPARATUS

RELATED PATENT APPLICATIONS

1. The patent application of James W. Keeley and Thomas F. Joyce entitled, "Multiprocessor Shared Pipeline Cache Memory", filed on Sept. 27, 1984, bearing Ser. No. 06/655,473, now U.S. Pat. No. 4,695,943, which issued on Sept. 22, 1987 and which is assigned to the same assignee as this patent application. This application discloses the architecture of the cache unit of the present invention.

2. The patent application of James W. Keeley entitled, "A Coherent Cache System Shared by a Pair of Processing Units", filed on even date as this application, bearing Ser. No. 06/879,864, which is assigned to the same assignee as this patent application. This application discloses a multiple allocation protection mechanism utilized in the cache unit of the present invention.

BACKGROUND OF THE INVENTION

1. Field of Use

The present invention relates to cache memory systems and more particularly to cache memory systems utilized in multiprocessor systems.

2. Prior Art

It is well known that cache memories have been highly effective in increasing the throughput of small and large monoprocessor and multiprocessor systems. In such systems, caches are frequently configured in a so-called private cache arrangement in which the cache memory is dedicated to a single processor.

To increase system throughput, systems have increased the number of processing units, each connecting a cache memory which, in turn, connected to main memory and the other units of the overall system via an asynchronous system bus. In such systems, the independently operating processing units produce unsynchronized overlapping requests to main memory. This can substantively affect cache coherency which is the ability of the cache to accurately and correctly track the contents of main memory. The result is that processing units can be forced to operate with stale data which could eventually bring the system to a halt.

In general, there have been two basic approaches employed in maintaining cache coherency. The first termed a write through approach employs a listener device which detects the occurrence of any write operations made to main memory and updates the contents of the cache. The second approach employs circuits which invalidate the data contents of the cache locations when any other system unit writes into a main memory location which has been mapped into a processing unit's cache.

Employing the write through approach, one prior art cache system detects when any data is read or written into main memory by another unit prior to the receipt of the requested data which falls within a given address range. If it does, the cache is bypassed and the requested data is transferred to the requesting processing unit. While this ensures cache coherency, the process of bypassing cache can result in decreased system efficiency. This occurs as the system becomes busier due to the addition of more and faster processing units resulting in a substantial decrease in cache hit ratio.

Accordingly, it is a primary object of the present invention to provide a cache memory which maintains cache coherency without decreasing system efficiency.

It is a further object of the present invention to maintain a cache coherency notwithstanding unsynchronized overlapping memory requests by a number of independently operated processing units which connect to a system bus through independent interfaces.

SUMMARY OF THE INVENTION

The above objects and advantages are achieved in a preferred embodiment of the present invention. In the preferred embodiment, a cache memory subsystem couples to main memory through interface circuits via an asynchronous system bus in common with a number of central processing subsystems which have similar interface circuits. The cache memory subsystem includes multilevel directory memory and buffer memory pipeline stages shareable by a number of processing units.

According to the present invention, read in process (RIP) memory means is operatively associated with one of the pipeline stages. The RIP memory means is set to a predetermined state in response to read request from a processing unit which produces a miss condition indicating that the requested data is not resident in the buffer memory stage. Setting occurs when listener apparatus coupled to the system bus detects that the cache memory subsystem has forwarded a request for the missing data to main memory and presents that memory request to the cache memory subsystem resulting in the preallocation of directory memory. When so set, the RIP memory means identifies the address of the directory location within a specific level which was preallocated. The listener apparatus maintains the contents of the buffer memory stage coherent by updating its contents in response to any request applied to the system bus by other subsystems.

In the preferred embodiment, prior to the receipt of the requested data from main memory, the cache memory subsystem, in response to detecting that the listener apparatus has been receiving data which would make the buffer memory incoherent, operates to switch control means associated with the RIP memory from a preset state to a different state. When the requested data is received, the directory memory is accessed, the RIP memory means is reset and the latest version of the requested data is forwarded to the requesting processing unit as a function of the state of the control means. That is, when the control means has been switched to a different state, this denotes that the requested data is not the most recent data (e.g. has been modified by another processing unit). Therefore, the latest version of the data stored in the buffer memory is read out and transferred to the requesting processing unit while the data received from main memory is discarded. However, when the control means has remained in an initially preset state, this denotes that the data received from main memory is the most recent data. Thus, the requested data is written into the buffer memory and transferred to the requesting processing unit.

The arrangement of the present invention is able to maintain coherency without decreasing the cache efficiency, since requested main memory data will be written into the buffer store unless it proves to be stale (not the most recent). Of course, this presumes that the data meets those requirements necessary for insuring data integrity (e.g. error free).

In addition to maintaining coherency, the arrangement of the present invention ensures that the operation of the cache memory subsystem is properly synchronized with the asynchronous operations of the system bus. That is, the same memory request sent to main memory on the system bus is also presented to the cache memory subsystem during the same cycle resulting in the preallocation of the direction memory. This ensures reliable operation within the pipelined stages.

In addition to the above, the arrangement of the present invention can be used to maintain cache coherency between a pair of the processing units sharing the cache memory subsystem. In such circumstances, a second memory is associated with the other pipeline and is conditioned to store the same information as the RIP memory. When the other processing unit makes a memory read request for the same data, the state of the second memory blocks the loading of the other processing unit's data registers causing a miss condition. This allows the other processing unit to stall its operations until such time as the requested main memory data can be provided.

A single memory associated with the directory stage may be used to maintain coherency between processing units. However, for performance reasons, it is preferable to use a memory in each pipeline stage. This eliminates the need to have to perform read modify write operations which would increase the time of a pipeline stage to perform the required operations. Also, the arrangement allows sufficient time for signalling the processing unit to stall its operations.

The novel features which are believed to be characteristic of the invention both as to its oganization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 2, consisting of two sheets, is a block diagram of one of the central subsystems of FIG. 1 constructed according to the present invention.

DESCRIPTION OF THE SYSTEM OF FIG. 1

Figure 1:
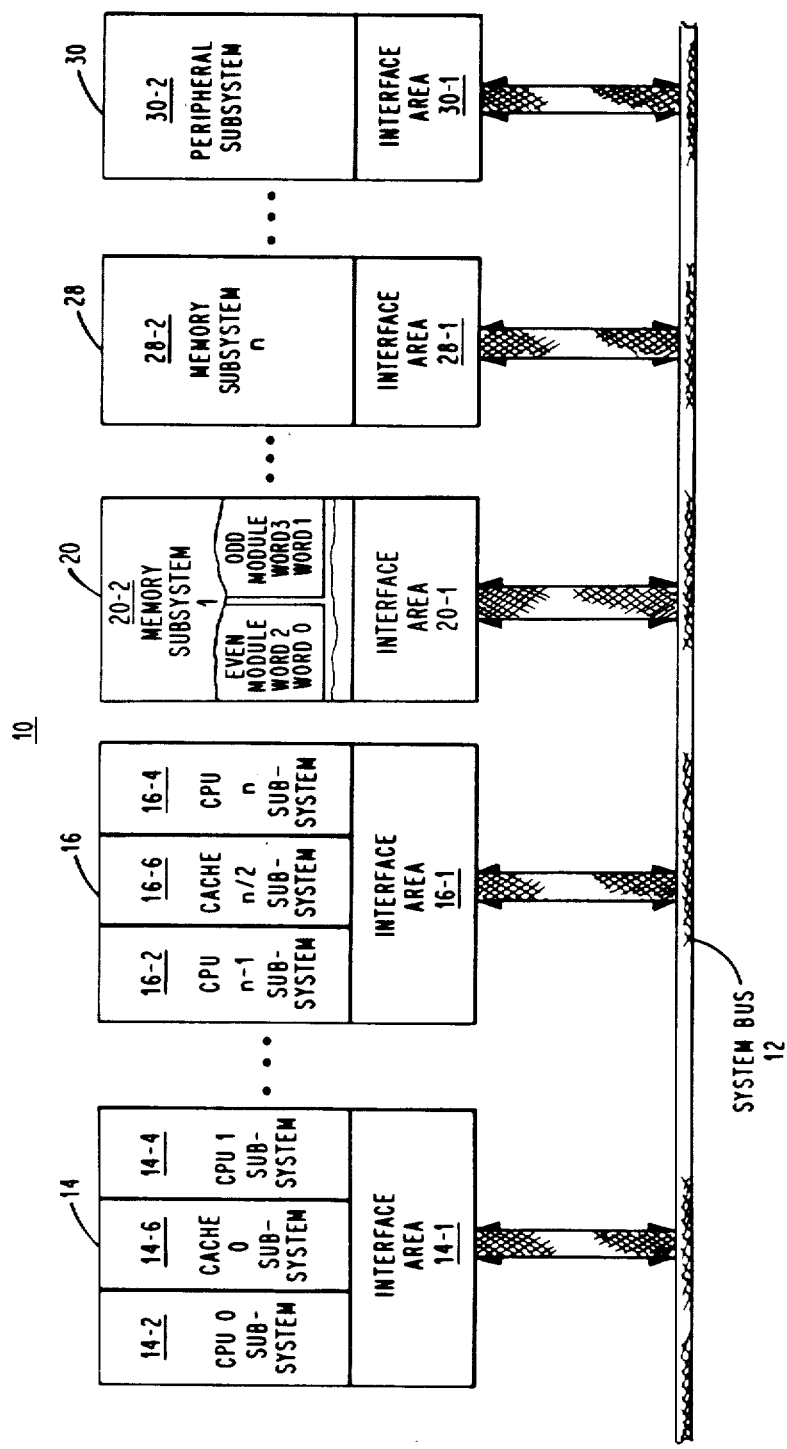
FIG. 1 is a block diagram of a system which includes the apparatus of the present invention.

FIG. 1 shows a multiprocessor data processing system 10 which includes a plurality of subsystems 14 through 30 which couple in common to a system bus 12. The illustrative subsystems include a plurality of central subsystems 14 through 16, a plurality of memory subsystems 20 through 28 and a peripheral subsystem 30. Each memory subsystem in organized to include even and odd memory modules. An example of such an arrangement is disclosed in U.S. Pat. No. 4,432,055.

Each subsystem includes an interface area which enables the unit or units associated therewith to transmit or receive requests in the form of commands, interrupts, data or responses/status to another unit on system bus 12 in an asynchronous manner. That is, each interface area can be assumed to include bus interface logic circuits such as those disclosed in U.S. Pat. No. 3,995,258, entitled "Data Processing System Having a Data Integrity Technique", invented by George J. Barlow.

The organization of each of the central subsystems 14 through 16 is the same. FIG. 2 shows in block diagram form the organization of central subsystem 14. Subsystem 14 includes a pair of central processing unit (CPU) subsystems 14-2 and 14-4 coupled to share a cache subsystem 14-6. The cache subsystem 14-6 couples to system bus 12 through a first in first out (FIFO) subsystem 14-10 which can be considered as being included within interface area 14-1.

As seen from FIG. 2, both CPU subsystems 14-2 and 14-4 are identical in construction. That is, each CPU subsystem includes a 32-bit central processing unit (CPU) (i.e., CPU's 14-20 and 14-40), and a virtual memory management unit (VMMU) (i.e., VMMU 14-26 and 14-46) for translating CPU virtual addresses into physical addresses for presentation to cache subsystem 14-6 as part of the memory requests. Also, each CPU subsystem includes a read only store (ROS) and a 16-bit ROS data output register (RDR) (i.e., ROS 14-25, 14-44 and RDR 14-25, 14-45).

At the beginning of each cycle, each ROS is conditioned to read out a 16-bit microinstruction word into its data output (RDR) register which defines the type of operation to be performed during the cycle (firmware step/box). The clock circuits within each CPU subsystem (i.e., circuits 14-22 and 14-42) establish the basic timing for its subsystem under the control or cache subsystem 14-6 as explained herein. The elements of each CPU subsystem can be constructed from standard integrated circuit chips.

As seen from FIG. 2, cache subsystem 14-6 is organized into a source address generation section and two separate pipeline stages, each with its own decode and control circuits. The source address generation section includes blocks 14-62 and 14-64 which perform the functions of source address selecting and incrementing. The first pipeline stage is an address stage and includes the directory and associated memory circuits of blocks 14-66 through 14-76, arranged as shown. This stage performs the functions of latching the generated source address, directory searching and hit comparing. The first pipline stage provides as an output information in the form of a level number and a column address. The operations of the first pipeline stage are clocked by timing signals generated by the timing and control circuits of block 14-60.

The information from the first stage is immediately passed onto the second pipeline stage leaving the first stage available for the next source request. The second pipeline stage is a data stage and includes the data buffer and associated memory circuits of blocks 14-80 through 14-96, arranged as shown. This stage performs the functions of accessing the requested data from the buffer memories 14-88 and 14-90, or replacing/storing data with data received from FIFO subsystem 14-10. Thus, the second pipeline stage provides a 36-bit data word for transfer to one of the CPU subsystems. Again, the operations of the second pipeline stage are clocked by timing signals generated by the timing and control circuits of block 14-60.

The different blocks of the first and second pipeline stages are constructed from standard integrated circuits, such as those described in the "The TTL Data Book Column 3", Copyrighted 1984, by Texas Instruments Inc. and in the "Advanced Micro Devices Programmable Array Logic Handbook", Copyright 1983 by Advanced Micro Devices, Inc. For example, the address selector circuit of block 14-62 is constructed from two sets of six 74AS857 multiplexer chips cascaded to select one of four addresses. The swap multiplexer of block 14-92 is constructed from the same type chips. The latches of blocks 14-68 and 14-72 are constructed from 74AS843 D-type latch chips. The swap multiplexer and data register circuits of block 14-70 are constructed from a single clocked programmable array logic element, such as part number AMPA16R6A, manufactured by Advanced Micro Devices, Inc.

Figure 3:
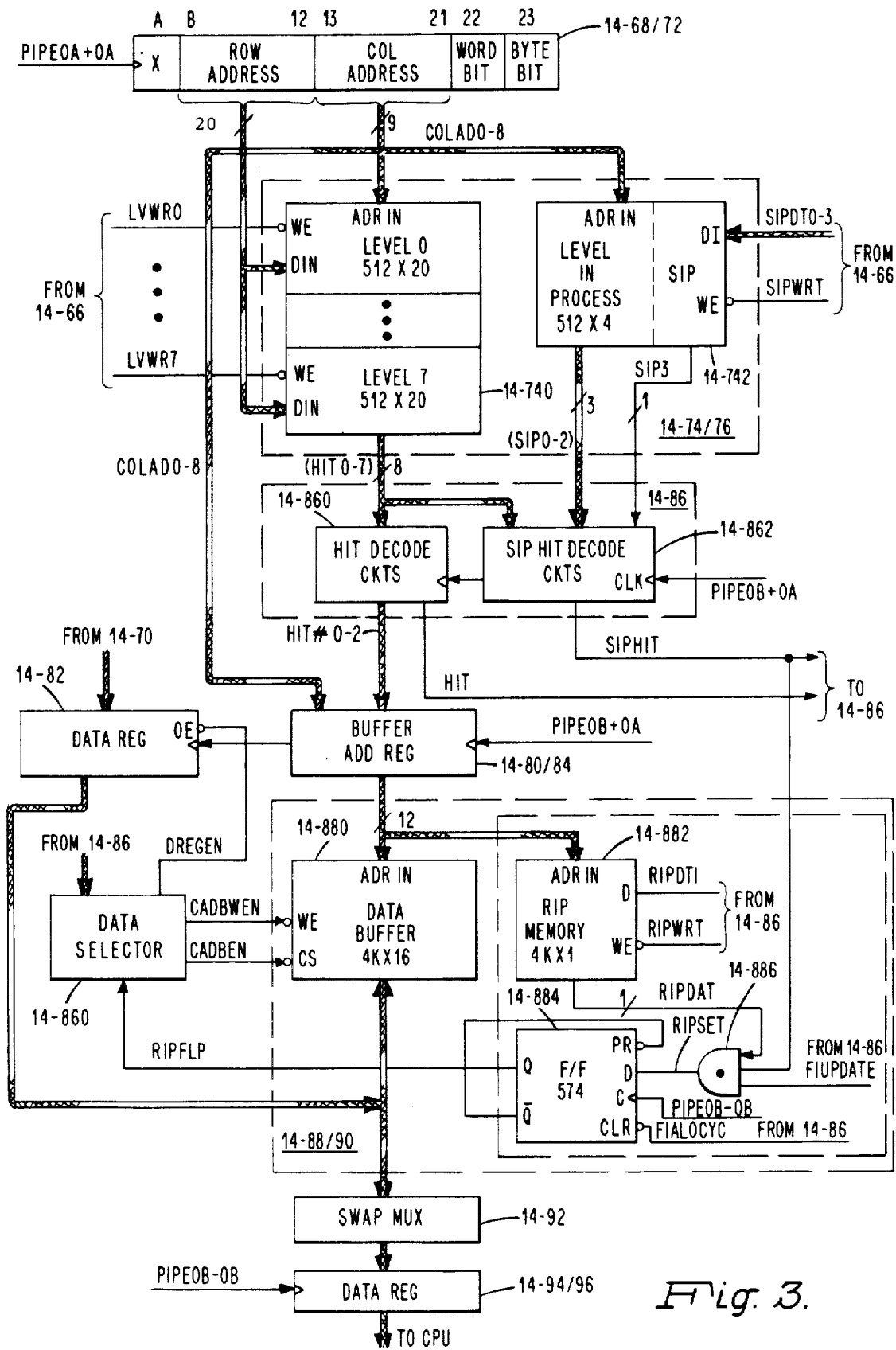
FIG. 3 shows in greater detail the circuits of the pipeline stages of FIG. 2.

The directory and associated memories 14-74 and 14-76 shown in greater detail in FIG. 3, are constructed from 8-bit slice cache address comparator circuits having part number TMS2150JL, manufactured by Texas Instruments Incorporated and a 4K×4-bit memory chip having part number IMS1421, manufactured by INMOS Corporation. The address and data registers 14-80 through 14-84 and 14-94 and 14-96 are constructed from 9-bit interface flip-flops having part number SN74AS823, manufactured by Texas Instruments, Inc.

The buffer memories 14-88 and 14-90, shown in greater detail in FIG. 3, are also constructed from 4K×4-bit memory chips having part number IMS1421, manufactured by INMOS Corporation and a 4096×1 static RAM chip having part number AM2147, manufactured by Advanced Micro Devices, Inc. The address increment circuits of block 14-64 are constructed from standard ALU chips designated by part number 74AS181A and a programmable array logic element having part number AmPAL16L8A, manufactured by Advanced Micro Devices, Inc.

The first and second levels of command register and decode circuits of block 14-66 and 14-86, respectively, utilize clocked programmable array logic elements having part numbers AmPAL16R4A and AmPAL16R6A, manufactured by Advanced Micro Devices, Inc. These circuits generate the required selection, read and write control signals as indicated in FIG. 2 (i.e., signals SWAPLT+00, SWAPRT+00, P0LDDT-OL, P1LDDT-OL, P0LDDFOR, F1LDDT-OR). For further details, reference may be made to the equations of the Appendix.

As seen from FIG. 2, cache subsystem 14-6 is organized into even and odd sections which permit two data words to be accessed simultaneously in response to either an odd or even memory address. For further information about this type of cache addressing arrangement, reference may be made to U.S. Pat. No. 4,378,591 which is assigned to the same assignee as named herein.

FIG. 2 also shows in block form, FIFO subsystem 14-10 which includes the FIFO control and clocking circuits of block 14-11 which couples to a replacement address register 14-12 and to system bus 12. FIFO subsystem 14-10 receives all of the information transferred between any two subsystems on system bus 12. When the information is for updating data in main memory, the information is coded to indicate such updating or replacement operation. FIFO subsystem 14-10 also receives any new data resulting from a memory request being forwarded to system bus 12 by cache subsystem 14-6. Both update and new data are stored as requests within a buffer memory included within subsystem 14-10. FIFO control circuits decode each request and initiate the appropriate cycles of operation which result in address, data and commands being applied to different parts of cache subsystem 14-6 as seen from FIG. 2. For the purpose of the present invention, FIFO subsystem can be considered conventional in design and take the form of the type of FIFO circuits disclosed in U.S. Pat. No. 4,195,340 which is assigned to the same assignee as named herein.

The basic timing for each of the subsystems of FIG. 2 is established by the timing and control circuits of block 14-60. Such control permits the conflict-free sharing of cache subsystem 14-6 by CPU subsystems 14-2 and 14-4 and FIFO subsystem 14-10. The circuits of block 14-60 are described in greater detail in the first related patent application. Briefly, these circuits include address select logic circuits which generate control signals for conditioning address selector 14-62 to select one of the subsystems 14-2, 14-4 and 14-10 as a request address source.

Also, block 14-60 includes pipeline clock circuits of block 14-620 which define the different types of cache memory cycles which can initiate the start of the pipeline resulting in the generation of a predetermined sequence of signals in response to each request. That is, first and second signals, respectively, indicate a cache request for service by CPU0 subsystem 14-2 and CPU1 subsystem 14-4 while other signals indicate cache requests for service by FIFO subsystem 14-10. These requests can be summarized as follows:

1. CPU0 READ CYCLE

A CPU0 read occurs in response to a cache request initiated by ROS 14-24 during a first time slot/interval when CPU port 0 within interface 14-1 is not busy. The address supplied by CPU0 subsystem 14-2 is furnished to the first pipeline stage and the directory is read. When a hit is detected, indicating that the requested data is stored in the data buffer, the buffer is read and the data is clocked into the CPU0 data register. When a miss is detected, the CPU0 port is made busy, the request is forwarded to memory to fetch the requested data.

2. CPU1 READ CYCLE

A CPU1 read occurs in response to a cache request initiated by ROS 14-44 during a third time slot/interval when CPU port 1 within interface 14-1 is not busy.

3. SECOND HALF BUS CYCLE

A second half bus cycle occurs in response to a first type of cache request initiated by FIFO subsystem 14-10 for data requested from either main memory or an I/O device being returned on system bus 12 during a first or third time slot/interval when FIFO subsystem 14-10 has a request stored. When FIFO subsystem 14-10 furnishes data from an I/O device to the first pipeline state, it passes therethrough without hanging the states of any memories and is clocked into the appropriate CPU data register. Data from main memory is written into the cache data buffers and is clocked into the appropriate CPU data registers.

4. MEMORY WRITE UPDATE CYCLE

A memory write update cycle occurs in response to a second type of cache request initiated by FIFO subsystem 14-10 for replacement or update data received from system bus 12, upon acknowledgement of such data during a first or third time slot/interval when FIFO subsystem 14-10 has a request stored. FIFO subsystem 14-10 furnishes data to the first pipeline stage resulting in the reading of the directory memory. When a hit is detected, the replacement data is written into the buffer memory.

5. FIFO ALLOCATION CYCLE

A FIFO allocation occurs in response to a CPU0 or CPU1 READ CYCLE which results in a miss being detected. The CPU port is made busy and the request is forwarded to memory to fetch the requested data. Upon the memory read request being acknowledged, the CPU read request is loaded into the FIFO subsystem registers and control circuits included in the subsystem initiate a request for a FIFO cycle of operation (i.e., force signal CYFIFO=1). Signals specifying the type of request and level number information are applied as inputs to the command register and decode circuits of block 14-66. These signals include FIMREF (memory reference ), $\overline{\text{FIWRIT}}$ (memory read) and FIDT16-18/19-21 (level number). The signals FIMREF and $\overline{\text{FIWRIT}}$ initiate a FIFO allocation cycle (i.e., FIALOCYC=1).

FIG. 3 shows the organization of the even and odd directory memory and buffer memory pipeline stages, according to the present invention. As seen from FIG. 3, the directory and associated memory circuits of blocks 14-74 and 14-76, each include a multilevel 4K×20-bit directory memory 14-740 and a second half bus cycle in process 512×4-bit memory (SIP) 14-742.

The directory memory 14-740, in response to a cache address, generates eight hit output signals (HIT0-7) which are applied to the hit decode circuits of block 14-86. The directory memory 14-740 is written in response to write enable signals LVWR0 through LVWR7 from circuits 14-66. The SIP memory 14-742, in response to the cache column address, generates four output signals (SIP0-3) which are also applied to the hit decode circuits of block 14-86. The SIP memory 14-742 is written with level number and SIP bit signals as a function of input data signals SIPDT0-3 and a write enable signal SIPWRT generated by the circuits of block 14-66. For further details as to how these signals are generated, reference may be made to the equations of the Appendix.

The hit decode circuits of block 14-86 include the hit decode circuits of block 14-860 and the SIP hit decode circuits of block 14-862. In the preferred embodiment, separate clocked PLA elements are used to construct the hit decode circuits of blocks 14-860 and 14-862.

In response to the input signals shown, hit decode circuits of block 14-860 generate hit level number output signals HIT0-2 and HIT. These signals indicate the level at which the hit occurred and the hit condition occurrence during a second half bus cycle or update cycle (i.e., normal operation). Simultaneously, the priority encoded SIP hit decode circuits of block 14-862 generate a SIP output signal SIPHIT upon detecting the presence of a potential coherency problem due to both processing units having requested the same data. For further details as to how these signals are generated, reference may be made to equations in the Appendix.

The outputs from the circuits of blocks 14-860 and 14-682 are applied as inputs to the circuits of the data buffer pipeline stage as shown. According to the preferred embodiemnt of the present invention, the data buffer and associated memory circuits of blocks 14-88 and 14-90, each include 4K×16-bit data buffer 14-880, and 4K×1-bit read in process (RIP) memory 14-882 and associated D-type clocked control flip-flop 14-884 and AND gate 14-886 all of which connect as shown.

The RIP memory 14-882 is written as a function of an input data signal RIPDTI and write a enable signal RIPWRT generated by the circuits of block 14-86. For further details as to how these signals are generated, reference may be made to the equations in the Appendix.

The data output signal RIPDAT from the RIP memory 14-882 is loaded into control flip-flop 14-884 via AND gate 14-886 in response to a HIT signal from block 14-860 during an update cycle (i.e., when signal FIUPDATE is a ONE). The flip-flop 14-884 is preset to a binary ZERO state during an allocate cycle (i.e., when signal $\overline{\text{FIALOCYCLE}}$ is a binary ZERO). The output signal RIPFLP from the flop-flop 14-884 is applied as an input to a data selector circuit 14-866 which is also included within block 14-86.

As a function of the state of signal RIPFLP, data selector circuit 14-866 generates output enable signals CADREGEN, CADBWEN and CADBEN which selectively condition data register 14-82 and data buffer memory 14-880 to provide the data signals to be loaded into one of the CPU data registers 14-94 and 14-96. For further details as to how these signals are generated, reference may be made to the equations in the Appendix.

DESCRIPTION OF OPERATION

With reference to the flow diagrams of FIGS. 4a and 4b, the operation of the apparatus of the present invention shown in FIG. 3 will now be described. In the system of FIG. 1, each processing unit can initiate processing requests to memory. The memory subsystem normally operates to queue the memory requests and process each request in sequence. In certain instances, one processing unit may be reading a word or a part of a word from the same location another processing unit is updating or writing. Since the processing unit can apply the write request to system bus 12 before the memory subsystem delivers the information requested by the first processing unit, the information actually delivered to the first processing unit will be incoherent. That is, the information will contain a mixture of old and new information.

While it may be possible to avoid incoherency by requiring the imposition of locking instructions for processing units sharing common areas of memory, this may not always be practical. Also, it may be difficult to detect and prevent violations.

The apparatus of the present invention not only enables the cache subsystem to provide coherent data to its associated processing unit or units, but it provides the latest version of the data being requested. In the preferred embodiment, the read in process RIP memory apparatus is included in both the even and odd cache sections so as to provide coherency for each of the two 16-bit words. Of course, this apparatus can be expanded to provide the same degree of coherency for each byte of each word. This can be done by duplicating the RIP memory apparatus.

Figure 4A:
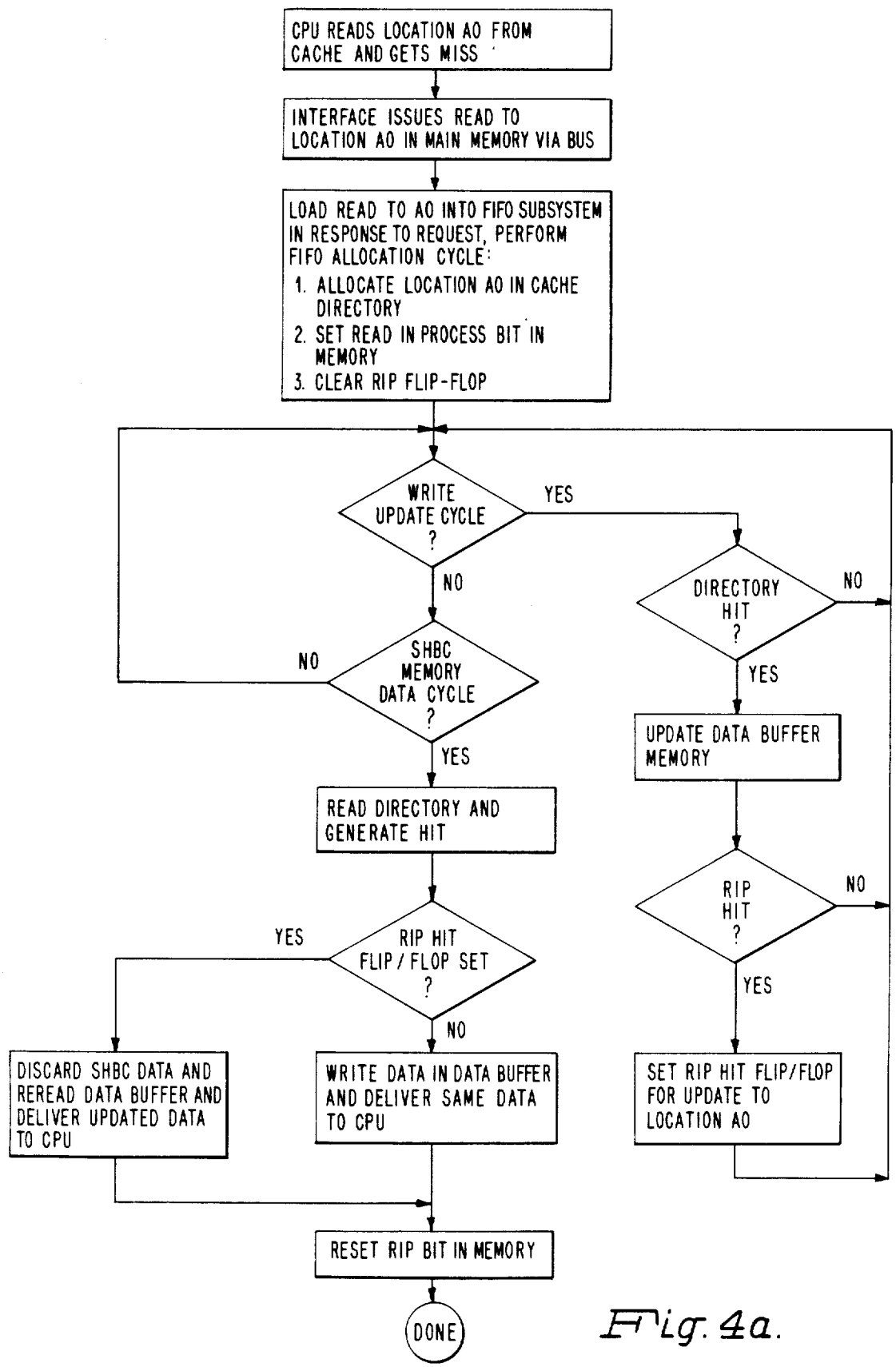
FIGS. 4a and 4b are flow diagrams used to explain the operation of the apparatus of the present invention used in differently configured central subsystems.

The sequence of operations shown in FIG. 4a illustrate the operation of a system configured as a single processing unit which couples to system bus 12 through a single cache. In this case, FIG. 3 need only include a single memory (either SIP memory 14-742 or RIP memory 14-882). For performance reasons, it is desirable to include the memory in the first pipeline stage. It will be appreciated that both memories 14-742 and 14-882 are equivalent. To increase the speed of operation of RIP memory 14-882, the memory is organized into a 4K by 1-bit memory. Each of the 512 addresable locations has 8 levels associated therewith. Thus, the levels are encoded and their value determined through accessing the memory.

In the case of the single processing unit configuration, the output SIPHIT from the SIP hit decode circuits of block 14-862 are connected as an input to AND gate 14-886 in place of the RIPDAT signal. The RIP memory 14-882 is therefore eliminated.

With reference to the flow chart of FIG. 4a, it will be assumed that CPU 0 couples to cache subsystem 14-6. When CPU 14-2 requests the data word 0 stored at location A0 of the even memory module of memory subsystem 20-2 of Figure, the cache subsystem 14-6 hit decode circuits of block 14-660 signal a miss condition (i.e., signal HIT=0). This signal causes the interface area 14-1 to issue a read request to the main memoy subsystem 20-2 requesting the data word stored at location A0. That is, memory read request is applied to the system bus 12 and, upon being accepted by the memory subsystem 20-2, is acknowledged by its interface area 20-1 circuits.

Upon being acknowledged, the same read request is loaded into the FIFO subsystem 14-10 from system bus 12. In this manner, the bus request is synchronized with the cache pipeline timing. The cache memory address is applied via address selector circuit 14-62 to the address latches 14-68/74 while certain command and data bits are applied to the command register and decode circuits of block 14-66. This occurs whenever there is a free pipeline stage and FIFO subsystem 14-10 initiated a request for a FIFO cycle (i.e., signal CYFIFO=1).

The command bits specifying the type of FIFO request are decoded by the circuits of block 14-66. Since the request is a memory read request, signals FIMREF and $\overline{\text{FIWRIT}}$ are binary ONES. These signals force signal FIUPDATE to a binary ONE initiating a FIFO allocation cycle of operation (i.e., signal FIALOCYC=1).

As seen from FIG. 4a, the cache subsystem preallocates the directory by writing the row address portion of the read request cache address into the location specified by the cache column address at the designated level. The level is determined by decoding the level number bits FIDT16-18 or FIDT19-21 from FIFO subsystem 14-10 which forces a corresponding one of the directory write enable signals LVWR0 through LVWR7 to a binary ZERO.

At the same time, RIP memory 14-742 is set to a predetermined state for denoting that there is a read in process. That is, the level number and read in process bits are written into the location specified by the cache column address in response to signals SIPDT0-3 and SIPWRT. At that time, signal $\overline{\text{FIALOCYC}}$ presets RIP flip-flop 14-884 to a binary ZERO state.

As seen from FIG. 4a, the FIFO subsystem 14-11 listens for any write request made by another processing unit. The receipt of any such request causes the FIFO subsystem 14-10 to initiate a memory write update cycle (i.e., forces signal FIUPDATE to a binary ONE). In the same manner as described above, the memory write cache address is applied via latches 14-68/72 to the directory memory 14-740 and memory 14-742 of FIG. 3.

During each write update cycle, the directory and associated memory circuits are accessed by cache column address signals COLAD0-8. The directory memory 14-740 operates to generate hit signals HIT0-7 indicating whether or not the data being updated is stored in data buffer 14-880 and if stored, the level in the data buffer where it is stored. At the same time, memory 14-742 operates to generate level number and RIP bit signals SIP0-3 indicating if a read in process state exists for that column address.

The hit decode circuits 14-680 operate to convert signals HIT0-7 into a three-bit hit level code which corresponds to signals HIT#0-2, in addition to generating hit output signal HIT indicating the occurrence of a hit condition. The SIP hit decode circuits 14-862 operate to compare the level number signals SIP0-2 with the converted signals HIT#0-2 for determining whether or not the data being updated will produce a coherence problem. When there is a match and the RIP bit signal is true, the hit decode circuits 14-862 force signal SIPHIT to a binary ONE indicating the potential coherency problem.

As seen from FIG. 4a, the occurrence of a directory hit causes the write update data loaded into data register 14-82 to be written into data buffer 14-880, in response to signals CADBWEN and CADBEN (i.e., both binary ZEROS). The data word is written into the location specified by cache column address signals COLAD0-8 and hit level number signals HIT#0-2 which were loaded into buffer address register 14-80/84, in response to clocking signal PIPEOB+OA. At this time, the occurrence of a RIP hit causes RIP flip-flop 14-884 to be switched to a binary ONE, in response to signals SIPHIT and FIUPDATE and timing signal PIPEOB-OB.

When set to a binary ONE, the RIP flip-flop ensures that the cache subsystem furnishes coherent data to the processing unit notwithstanding the fact that the requested data word was updated by another processing unit. More sepcifically, when the requested data word is received from main memory, during a second half bus cycle, another FIFO cycle is initiated. This results in the requested data word being transferred via the SWAPMUX data register 14-70 to data register 14-82.

Also, the cache address signals are applied to the directory memory 14-740. Since the directory has been preallocated, reading the directory results in the generation of a hit condition by hit decode circuits 14-680, as indicated in FIG. 4a. Next, the state of RIP flip-flop 14-884 is examined. The state of signal RIPFLP conditions data selector 14-866 to select the latest version of the data word for transfer to the processing unit. That is, when signal RIPFLP is a binary ONE as in the present example, this indicates that an update cycle to the same location as the requested data had occurred before the SHBC cycle which returned the requested data word. Therefore, data selector circuits 14-866 are conditioned to discard the returned data word stored in data register 14-82 and enable data buffer 14-880 for reading out the updated data word to the CPU data register 14-94/96. This is accomplished by data selector circuit 14-866 forcing signal DREGEN to a binary ONE disabling data register 14-82 and signal CADBEN to a binary ZERO enabling data buffer 14-880.

As seen from FIG. 4a, when RIP flip-flop 14-886 has not been set to a binary ONE, the data word is written into data buffer 14-880 and transferred to the CPU 0. That is, data selector circuit 14-860 enables data register 14-82 to apply the data word to CPU data register 14-94/96 (i.e., forces signal DREGEN to a binary ZERO) while conditioning data buffer 14-880 for writing the data word into location A0 at the specified level (i.e., forces signal CADBWEN to a binary ZERO and signal CADBEN to a binary ONE).

Also, during the SHBC cycle, the RIP bit is reset to a binary ZERO in response to signal SIPWRT. At the time, data input signal SIPDT3 is a binary ZERO.

From the above, it is seen that the apparatus of the present invention is able to both maintain coherency and provide a processing unit with the latest version of a coherent pair of data words. That is, the even and odd sections of the cache subsystem include the apparatus of FIG. 3 and operate in the manner ilustrated in FIG. 4a to inhibit the transfer of incoherent data words to CPU 14-2.

Figure 4B:
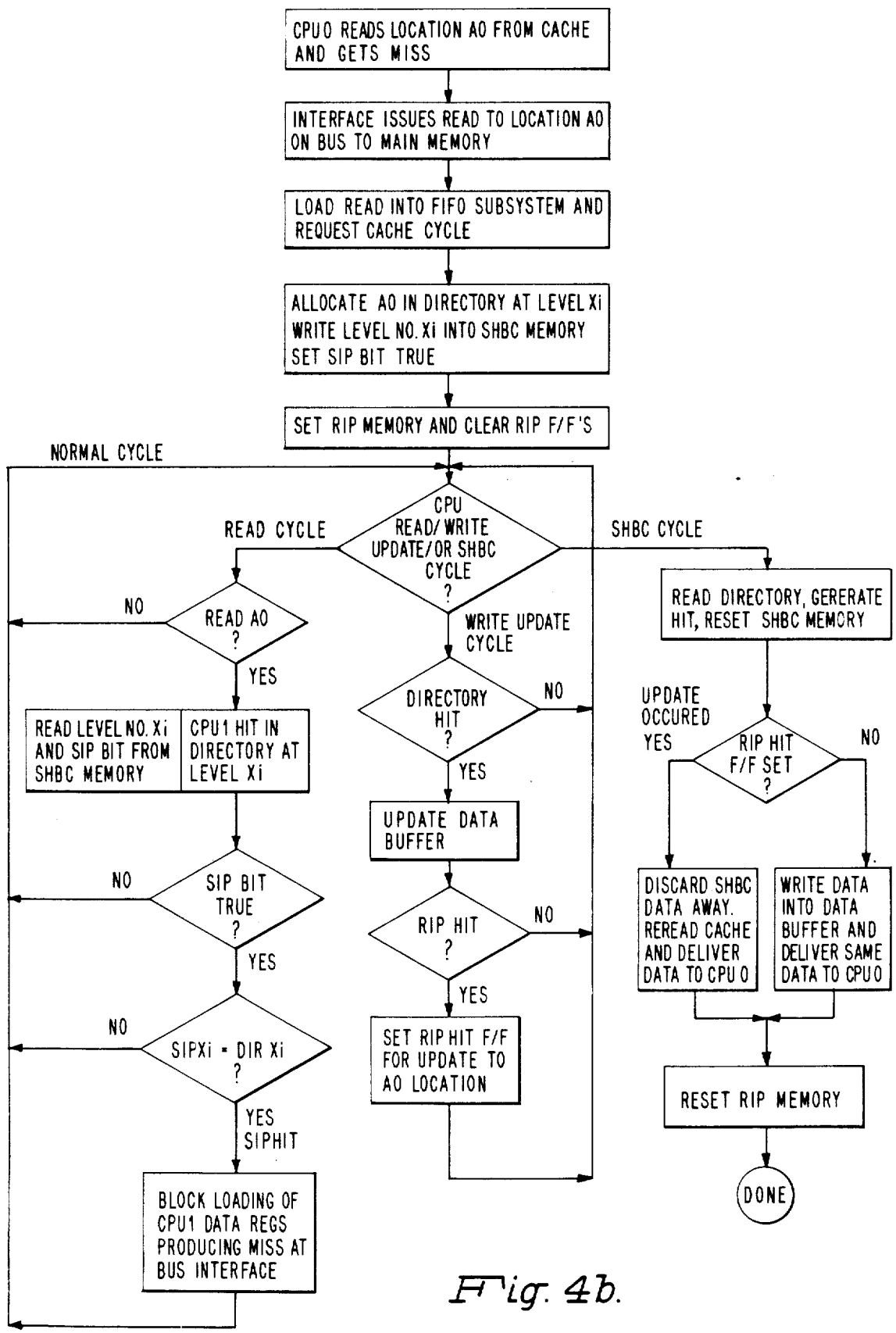

FIG. 4b illustrates the operation of the present invention when used in a system configured as cache subsystem 14-6 of FIG. 2. To ensure coherency between the two processing units CPU0 and CPU1 which share the cache subsystem, both of the memories 14-742 and 14-882 are utilized in the different pipeline stages as shown in FIG. 3. The arrangement provides performance benefits in that the memories in each pipeline stage are either written or read (i.e., no read modify write operations are required) thereby minimizing pipeline delays.

As seen from FIG. 4b, it is assumed that CPU0 generates a memory read request to read word 0 from location A0 of main memory subsystem 20 which produces a miss condition. In the same manner as described above, the interface 14-1 issues a memory read request to main memory subsystem 20 for data word 0 in location A0. Also, CPU0 signals the memory subsystem 20 that the read is a double word read (i.e., forces a double word bus line to a binary one state). This causes subsystem 20 to furnish data words from the even and odd memory modules (i.e., locations A0 and A0+1) to CPU0.

As shown in FIG. 4b, the memory read request is loaded into FIFO subsystem 14-10 and results in a FIFO cache cycle request. As previously discussed, the directory memory 14-740 of the even and odd cache sections is preallocated by writing the read request cache row address into the location A0 specified by the cache column address at the designated level (Xi). At the same time, the SIP memory 14-742 is accessed and the level number Xi along with the SIP bit are written into the location A0 specified by the cache column address.

Next, the RIP memory 14-882 of the even and odd cache sections is accessed. The RIP bit location specified by the cache column address hit number signals HIT#0-2 is set to a binary ONE in response to signals RIPDTI and RIPWRT generated by the circuits 14-86. Also, the RIP flip-flop 14-884 of each cache section is preset to a binary ZERO in the manner previously described.

As seen from FIG. 4b, the cache subsystem 14-6 in response to each request determines whether the request is for a CPU read, write update or second half bus cycle. Assume it is a CPU read cycle, the memory read request generated by CPU1 (i.e., CPU0 awaiting results of memory read request) is examined when it is presented to the cache subsystem 20 by CPU1. That is, the cache address loaded into latches 14-68/72 accesses directory memory 14-740 and SIP memory 14-742 of the even and odd cache sections. When CPU1 is requesting one of the data words previously requested by CPU0, the directory memory 14-740 generates output hit signals HIT 0-7 indicating the occurrence of a hit condition at level Xi.

The SIP hit decode circuits 14-862 operate to force signal SIPHIT to a binary ONE when the SIP bit is a binary ONE and the hit output signals HIT0-7 match the level number signals SIP0-2. The SIPHIT signal is used to indicate the presence of a coherency problem between CPU0 and CPU1.

As indicated in FIG. 4b, SIPHIT signal is used to block the loading a CPU1 data registers with data from data buffer 14-880 which produces a miss condition at interface area 14-1. This effectively cancels the request as far as cache subsystem 20 is concerned. To simplify the design, the interface area 14-1 still forwards CPU1's memory request to main memory subsystem 20 in response to the miss condition.

In response to each write update cycle, the memory write request is examined when it is presented to the cache subsystem 20 by FIFO subsystem 14-10 following the receipt of an acknowledgement from system bus 12. As described above, the cache address is applied via latches 14-68/72 to directory memory 14-740 and when the data word being updated is the same as that requested by CPU0, hit decode circuits 14-860 operate to generate a hit.

This results in the updated data word being written into daa buffer 14-880 at the location specified by the cache column address and hit level signals HIT#0-2. Also, at that time, RIP memory 14-882 is accessed. When the RIP bit has been set to a binary ONE signalling that a read is in process, this forces signal RIPDAT to a binary ONE. This causes RIP flip-flop 14-884 to be switched to a binary ONE in response to signals HIT, FIUPDATE and PIPEOB-OB as shown in FIG. 4b.

When main memory subsystem 20 completes its processing of the CPU0 memory read request, it operates to return data words 0 and 1 on system bus 12 during a second half bus cycle. As seen from FIG. 4b, a SHBC cycle is initiated during which the returned data words together with the cache address is presented to cache subsystem 20 by FIFO subsystem 14-10.

As described above, the cache address is applied to directory memory 14-740 which results in hit decode circuits 14-860 generating a hit. Also, SIP memory 14-742 is accessed and the SIP bit is reset to a binary ZERO in response to signal SIPWWRT.

As seen from FIG. 4b, the state of RIP flip-flop 14-884 determines whether data buffer 14-880 or data register 14-82 contains the latest version of the request data words. When set to a binary ONE, signal RIPFLP conditions data selector circuit 14-866 to inhibit the transfer of the SHBC data from register 14-82. It also enables the rereading of cache data buffer 14-880 by forcing signal CADBEN to a binary ZERO and the delivery of the updated data words to the CPU0 data register.

When RIP flip-flop 14-884 is a binary ZERO, this indicates that the requested data words have not been updated. Hence, the SHBC data words stored in register 14-82 are written into data buffer 14-880 and delivered to the CPU0 data register. As seen from FIG. 4b, during the SHBC cycle, the RIP bit accessed from RIP memory 14-882 is reset to a binary ZERO in response to signals RIPDTI and RIPWRT. Since this is not an allocation cycle, signal RIPDTI is a binary ZERO.

From the above, it is seen how the apparatus of the present invention ensures that each processing unit within a system or in the case of a shared cache, each pair of processing units within a system receive coherent data and the latest version of such coherent data. This is accomplished with the addition of few circuits within one or more of the pipeline stages of the cache subsystem of the preferred embodiment. For performance reasons, memory circuits are included in each pipeline stage of the shared cache subsystem.

APPENDIX

The equations for generating the signals of FIGS. 2 and 3 are given by the following Boolean expressions:

1. *P0LLDT−OL = $\underbrace{\text{CPUCYL·}\overline{\text{CPUNUM}}\text{·DBWDRD·EVNHIT·ODDHIT·}\overline{\text{ODDSIPHIT}}}_{\text{CPU READ CYCLE}}$ +

$\underbrace{\text{CPUCYL·}\overline{\text{CPUNUM}}\text{·DBWDRD·}\overline{\text{CMAD22}}\text{·CMAD23·EVNHIT·EVNSIPHIT}}_{\text{CPU READ CYCLE}}$ +

$\underbrace{\text{CPUCYL·}\overline{\text{CPUNUM}}\text{·DBWDRD·}\overline{\text{CMAD22}}\text{·CMAD23·ODDHIT·ODDSIPHIT}}_{\text{CPU READ CYCLE}}$ +

$\underbrace{\overline{\text{CPUCYL}}\text{·}\overline{\text{FIAD17}}\text{·FISHBA·RPMREF}}_{\text{I/O SHBC}}$ + $\underbrace{\overline{\text{CPUCYL}}\text{·FIAD17·FISHBA·RPMREF}}_{\text{MEM SHBC}}$ 2. *P0LLDT−OR = $\underbrace{\text{CPUCYL·}\overline{\text{CPUNUM}}\text{·DBWDRD·EVNHIT·ODDHIT·}\overline{\text{ODDSIPHIT}}}_{\text{CPU READ}}$ +

$\underbrace{\text{CPUCYL·}\overline{\text{CPUNUM}}\text{·DBWDRD·CMAD22·EVNHIT·EVNSIPHIT}}_{\text{CPU READ}}$ +

$\underbrace{\text{CPUCYL·}\overline{\text{CPUNUM}}\text{·DBWDRD·CMAD22·ODDHIT·}\overline{\text{ODDSIPHIT}}}_{\text{CPU READ}}$ +

$\underbrace{\overline{\text{CPUCYL}}\text{·}\overline{\text{FIAD17}}\text{·FISHBA·RPMREF}}_{\text{I/O SHBC}}$ + $\underbrace{\overline{\text{CPUCYL}}\text{·FIAD17·FISHBA·RPMREF}}_{\text{I/O SHBC}}$ 3. *P1LDDT−OL = same as 1 except $\overline{\text{CPUNUM}}$ = CPUNUM 4. *P1LDDT−OR = same as 2 except $\overline{\text{CPUNUM}}$ = CPUNUM.

5. *SWAPLT = $\underbrace{\text{CPUCYL·CMAD22}}_{\text{CPU READ}}$ + $\underbrace{\overline{\text{CPUCYL}}\text{·FISHBA·RPMREF·RPAD22}}_{\text{MEM SHBC}}$.

6. *SWAPRT = $\underbrace{\text{CPUCYL·DBWDRD·CMAD22}}_{\text{CPU READ}}$ + $\underbrace{\text{CPUCYL·}\overline{\text{DBWDRD}}\text{·}\overline{\text{CMAD22}}}_{\text{CPU READ}}$ +

$\underbrace{\overline{\text{CPUCYL}}\text{·FISHBA·RPMREF·(FIDBWD·RPAD22·}\overline{\text{FIDBWD}}\text{·}\overline{\text{RPAD22}}\text{)}}_{\text{MEM SHBC}}$

*These signals are clocked with signal PIPE0B+0A.

7. HIT = HIT0 + HIT1 + HIT2 + HIT3 + HIT4 + HIT5 + HIT6 + HIT7

8. $\overline{\text{HIT\#0}}$ = HIT1 + HIT2 + HIT3.

9. $\overline{\text{HIT\#1}}$ = HIT0 + HIT1 + HIT4·$\overline{\text{HIT2·HIT3}}$ + HIT5·$\overline{\text{HIT2·HIT3}}$ 10. $\overline{\text{HIT\#2}}$ = HIT0 + HIT2·$\overline{\text{HIT1}}$ + HIT4·$\overline{\text{HIT3·HIT1}}$ + HIT6 + $\overline{\text{HIT5·HIT3·HIT1}}$.

11. SIPHIT = SIP3·[HIT0·$\overline{\text{SIP0·SIP2}}$ + HIT0·HIT1·$\overline{\text{SIP0·SIP1·SIP2}}$ +

$\overline{\text{HIT0·HIT1}}$·HIT2·SIP0·SIP1·SIP2 +

-continued $\overline{HIT0} \cdot \overline{HIT1} \cdot \overline{HIT2} \cdot HIT3 \cdot \overline{SIP0} \cdot SIP1 \cdot SIP2 +$ $\overline{HIT0} \cdot \overline{HIT1} \cdot \overline{HIT2} \cdot \overline{HIT3} \cdot HIT4 \cdot SIP0 \cdot \overline{SIP1} \cdot \overline{SIP2} +$ $\overline{HIT0} \cdot \overline{HIT1} \cdot \overline{HIT2} \cdot \overline{HIT3} \cdot \overline{HIT4} \cdot HIT5 \cdot SIP0 \cdot SIP1 \cdot SIP2 +$ $\overline{HIT0} \cdot \overline{HIT1} \cdot \overline{HIT2} \cdot \overline{HIT3} \cdot \overline{HIT4} \cdot \overline{HIT5} \cdot HIT6 \cdot SIP0 \cdot SIP1 \cdot \overline{SIP2} +$ $\overline{HIT0} \cdot \overline{HIT1} \cdot \overline{HIT2} \cdot \overline{HIT3} \cdot \overline{HIT4} \cdot \overline{HIT5} \cdot \overline{HIT6} \cdot HIT7 \cdot SIP0 \cdot SIP1 \cdot SIP2.$ 12. $SIPWRT = \overline{[(FIALOCYC + CYFIFO \cdot FISHBC) \cdot WRTPLS]}.$

13. $SIPDT0-2 = FIDT16-18/FIDT19-21.$

14. $SIPDT3 = FIALOCYC.$

15. $RIPWRT = \overline{[(FIALOCYC + CYFIFO \cdot FISHBC) \cdot WRTPLS]}.$

16. $RIPWRT = FIALOCYC.$

17. $CADBWE = [FIUPDATE \cdot HIT + CYFIFO \cdot FISHBC \cdot \overline{RIPFLD}] \cdot WRTPLS.$ 18. $CADREGEN = CADBEN \cdot FISHBC \cdot \overline{RIPFLP} + \overline{CADBEN} + (CADBEN \cdot FIUPDATE).$ 19. $CADBEN = HIT \cdot (CPUCYL + FIUPDATE + MMSHBC)$ wherein $MMSHBC = FISHBC \cdot RPMREF.$ 20. $FIALOCYC = FIMREF \cdot \overline{FIWRIT}.$ 21. $FIUPDATE = FIMREF \cdot FIWRIT.$ 22. $LVWR0 = WRTPLS \cdot (\overline{FIDT16} \cdot FIDT17 \cdot FIDT18 + FIDT19 \cdot FIDT20 \cdot FIDT21).$ 23. $LVWR7 = WRTPLS \cdot (FIDT16 \cdot FIDT17 \cdot FIDT18 + FIDT19 \cdot FIDT20 \cdot FIDT21).$

DESCRIPTION OF EQUATION TERMS

1. DBWDRD = Double word read command defined by ROS data bit 4=1 and ROS data bit 5=0 generated by the decode circuits of block 14-66 which is clocked with signal PIPE0A+0A.

2. CPUNUM = CPU number (CPU0 or CPU1) signal generated by the circuits of block 14-66 which is clocked with signal PIPE0A+0A.

3. CPUCYL = CPU cycle signal generated by the circuits of block 14-66 and which is clocked with signal PIPE0A+0A.

4. EVNHIT = HIT signal generated by the hit decode circuits 14-680 associated with the even directory memory 14-76.

5. CMAD22 = Cache memory address bit 22 generated at the output of selector 14-62.

6. CMAD22 = Cache memory address bit 23, generated at the output of selector 14-62, specifies which half (left or right) of data register 14-94 or 14-96 is to be loaded with a data word.

7. FIAD17 = FIFO address bit 17 from FIFO subsystem 14-10 defines which CPU is to receive the replacement data.

8. FIDBWD = FIFO double-wide word command bit from FIFO subsystem 14-11 specifies when the data being returned has two words.

9. FISHBA = FIFO second half bus cycle acknowledge signal from 14-11 specifies that the FIFO subsystem requires a cache cycle to process data received from an I/O device or memory during a second half bus cycle SHBC.

10. ODDHIT = HIT signal generated by the hit decode circuits 14-680 associated with the odd directory memory 14-74.

11. RPMREF = Memory reference signal provided by RAR 14-12 which permits any exception conditions to be taken into account.

12. RPAD22 = Replacement address bit 22 from RAR 14-12.

13. FIDT16-18/19-21 = The even/odd data bits defining the cache level provided by the FIFO subsystem 14-10.

14. CYFIFO = A cycle signal generated by the FIFO cycle select logic circuits of block 14-60 during a free pipeline stage.

15. FISHBC = The second half bus cycle signal from FIFO subsystem 14-10.

16. WRTPLS = The write pulse signal generated by the circuits of block 14-60 which occurs midway between either clocking signals PIPE0A+0A AND PIPE0A+0B or clocking signals PIPE0B+0A and PIPE0B+0B.

17. FIMREF = The bus memory reference signal BSMREF from FIFO subsystem 14-10.

18. FIWRIT = The bus memory write signal BSWRIT from FIFO subsystem 14-10.

It will be appreciated by those skilled in the art that many changes may be made to the preferred embodiment of the present invention. As mentioned, there need only a be single memory associated with the directory memory stage in the case of a single processing unit. Where there is more than one processing unit sharing the cache subsystem, one memory is used for detecting incoherency between processing units while the second memory is used to indicate a read in process state included for increased performance. However, it still may be possible to combine both within a single memory, as well as the function of the RIP control flip-flop with attendant decrease in pipeline stage speed.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A multiprocessing system comprising a plurality of processing units and a main memory coupled in common to an asynchronous system, each processing unit including a cache unit for providing high speed access to coherent main memory data in response to requests and data transmitted on said system bus by said processing units, each request containing first and second address portions of a cache memory address generated by one of said processing units, said cache unit comprising:

a first stage including directory store means organized into a plurality of levels containing groups of storage locations, each location for storing said first address portion of a memory read request generated by said processing unit associated therewith and each different group of locations within said directory store levels being defined by a different one of said second address portions;

a second stage including data store means organized into the same number of levels of said groups of locations as in said directory store means and each different group of locations within said data store levels being accessed by a different one of said second address portions;

read in process (RIP) memory means included in one of said first and second cache stages, said RIP memory means including a plurality of locations, each location being accessed by a different one of said second address portions;

decode and control means coupled to said directory store means, to said RIP memory means and to said data store means, said decode and control means being operative during a cache allocation cycle in response to each request received from said processing unit for data not stored in said data store means to generate signals for placing the location specified by said second address portion in said RIP memory means in a predetermined state for identifying the data store location which has been preallocated; and control means coupled to said RIP memory means and to said decode and control means, said control means being conditioned by said decode and control means during a cache update cycle to switch to said predetermined state when said RIP memory means signals that a portion of the contents of said data store location which has been preallocated is being updated to maintain coherency prior to the receipt of the requested data and said control means being operative to condition said store means for transferring the most recent version of said requested data to said processing unit.

2. The cache unit of claim 1 wherein said directory store includes means for generating a plurality of hit signals indicating whether or not the requested data is stored in said cache data store means.

3. The cache unit of claim 2 wherein said RIP memory means is included in said first stage, said signals from said decode and control means conditioning said location specified by said second address portion of said cache address during said allocation cycle to store level number signals coded to specify the level in which said location has been preallocated together with a signal indicating that a memory read request is in process.

4. The cache unit of claim 3 wherein said decode and control means includes programmable logic array (PLA) circuit means coupled to said RIP memory means and to said means to generating, said PLA circuit means being operative upon detecting a match between said plurality of hit signals, said level number signals and said signal indicating that said memory read request is in process to generate an output hit control signal for switching said control means to said predetermined state.

5. The cache unit of claim 2 wherein said second cache stage further includes input data register means coupled to said system bus, to said data store means and to said processing unit, for receiving data from said bus to be written into said data store means and to be transferred to said processing unit in response to said requests and said control means being coupled to said input data register means, said control means being operative to selectively condition said input data register means and said data store means for transferring the most recent coherent version of said requested data to said processing unit.

6. The cache unit of claim 2 wherein said RIP memory means is included in said second stage, said RIP memory being organized into the same number of levels of said groups of locations as in said directory store means, and each location containing at least one bit position, said signals conditioning said bit location specified by certain ones of said signals and said second address portion of said cache address during said allocation cycle to store a signal indicating that a memory read request is in process.

7. The cache unit of claim 6 wherein said decode and control means includes programmable logic array (PLA) circuit means coupled to said RIP memory means and to said means for generating, said PLA circuit means being operative in response to said plurality of hit signals to generate a plurality of hit number signals together with a hit signal for conditioning said RIP memory means to store said signal indicating that said memory read request is in process and said RIP memory means during said update cycle being operative to read out said signal for switching said control means to said predetermined state.

8. The cache unit of claim 7 wherein said control means includes bistable means having an output coupled to said data store, a set input coupled to said RIP memory means for receiving said signal and a reset input coupled to said decode and control means, said decode and control means being operative to switch said bistable means to an initial state during said allocate cycle of operation for enabling said bistable means to be switched to said predetermined state in response to said signal during said update cycle.

9. The cache unit of claim 1 wherein said cache unit further includes FIFO listener means coupled to said system bus and to said first stage and to said decode and control means, said FIFO listener means being operative in response to each memory write request applied to said system bus by any other processing unit and acknowledged by said main memory, to store and subsequently present said first and second portions of said each memory write request to said directory store means and to said RIP memory means during said update cycle thereby synchronizing the receipt of asynchronously generated requests from said bus with the cycling of said cache unit.

10. The cache unit of claim 2 wherein said directory store means includes:
an even directory memory having a plurality of locations for storing a plurality of even addresses; and
an odd directory memory having a plurality of locations for storing a plurality of odd addresses; and wherein
said buffer memory means includes:
an even buffer memory having a plurality of storage locations associated with a different one of a plurality of even addresses; and
an odd buffer memory having a plurality of storage locations associated with a different one of a plurality of odd addresses; and
said RIP memory means includes:
an even RIP memory; and
an odd RIP memory associated with said even directory memory and said odd directory memory respectively when included in said first cache stage and said even buffer memory and said odd buffer memory respectively when included in said second cache stage.

11. A multiprocessing system comprising a plurality of processing subsystems and a main memory coupled in common to an asynchronous system, each processing subsystem including a cache unit for providing high speed access by a number of processing units to coherent main memory data in response to memory requests transmitted on said system bus by said processing subsystems, each memory request containing first and second address portions of a cache memory address generated by one of said processing subsystems, said cache unit comprising:
a first stage including a directory store organized into a plurality of levels containing groups of storage locations, each location for storing said first address portion of a memory read request generated by one of said number of processing units associated therewith and each different group of locations within said directory store levels being defined by a different one of said second address portions;
a second cache stage including:
a data store organized into the same number of levels of said groups of locations as in said directory store and each different group of locations within said data store levels being defined by a different one of said second address portions;
input data register means coupled to said bus, to said data store and to said processing units for receiving data to be written into said data store and transferred to said processing units in response to said requests; and
read in process (RIP) memory means including a plurality of locations, each location defined by a different one of said second address portions;
decode and control means coupled to said directory store, to said RIP memory means, to said data store and to said input data register means, said decode and control means being operative during an allocation cycle in response to each request received from said one of said number of processing units for data not stored in said data store to generate signals for placing the location in said RIP memory means specified by certain ones of said signals and said second address portion in a predetermined state for identifying the data store location which has been preallocated; and
control means coupled to said RIP memory means and to said decode and control means, said control means being conditioned by said decode and control means during an update cycle to switch to said predetermined state when said RIP memory means signals that a portion of the data contents of said preallocated data store location is being updated prior to the receipt of the requested data to be stored in the same data location and
said control means being operative to selectively condition said input data register means and said data store during a second half bus cycle for transferring the most recent coherent version of said requested data to said one of said processing units.

12. The multiprocessing system of claim 11 wherein said first stage further includes second half bus cycle in process (SIP) memory means including a plurality of locations, each location defined by a different one of said second address portions; and
said decode and control means being coupled to said SIP memory means, said decode and control means being operative during said allocation cycle in response to said each request received from one of said number of processing units for data not stored in said data store to generate signals for placing the location in said SIP memory means specified by said second address portion in said predetermined state for identifying said data store location which has been preallocated and
said decode and control means being operative in response to the contents of said location read out during a subsequent allocation cycle generated in response to a memory request from another one of said processing units to inhibit the transfer of data to said another processing unit from said preallocated location in cache store thereby maintaining data coherency between said processing units.

13. The cache unit of claim 12 wherein said signals from said decode and control means conditions said location in said SIP memory means specified by said second address portion of said cache address during said allocation cycle to store level number signals coded to specify the level in which said location has been preallocated together with a signal indicating that a memory read request is in process.

14. The cache unit of claim 13 wherein said decode and control means includes programmable logic array (PLA) circuit means coupled to said SIP memory means and to said means for generating, said PLA circuit means being operative upon detecting a match between said plurality of hit signals generated in response to said memory request from said another processing unit, said level number signals and said signal indicating that said memory read request is in process to generate an output hit control signal to inhibit said transfer.

15. The cache unit of claim 11 wherein said RIP memory is organized into the same number of levels of said groups of locations as in said directory store, and each location containing at least one bit position, said signals conditioning said bit location specified by certain ones of said signals and said second address portion of said cache address during said allocation cycle to store a signal indicative of said predetermined state.

16. The cache unit of claim 15 wherein said decode and control means includes programmable logic array (PLA) circuit means coupled to said RIP memory means and to said means for generating, said PLA circuit means being operative in response to said plurality of hit signals to generate a plurality of hit number signals together with a hit signal for conditioning said RIP memory means to store said signal indicating said predetermined state and said RIP memory means during said update cycle being operative to read out said signal for switching said control means to said predetermined state.

17. The cache unit of claim 16 wherein said control means includes bistable means having an output coupled to said data store, a set input coupled to said RIP memory means for receiving said signal and a reset input coupled to said decode and control means, said decode and control means being operative to switch said bistable means to an initial state during said allocation cycle of operation for enabling said bistable means to be switched to said predetermined state in response to said signal during said update cycle.

18. The cache unit of claim 11 wherein said cache unit further includes FIFO listener means coupled to said system bus and to said first stage and to said decode and control means, said FIFO listener means being operative in response to each memory write request applied to said system bus by any other processing unit and acknowledged by said main memory, to store and subsequently present said first and second portions of said each memory write request to said directory store and to said RIP memory means during said update cycle for synchronizing the receipt of asynchronously generated requests from said bus with the operation of said cache unit.

19. The cache unit of claim 12 wherein said directory store includes:
  an even directory memory having a plurality of locations for storing a plurality of even addresses; and
  an odd directory memory having a plurality of locations for storing a plurality of odd addresses; and wherein
  said buffer memory means includes:
    an even buffer memory having a plurality of storage locations associated with a different one of a plurality of even addresses; and
    an odd buffer memory having a plurality of storage locations associated with a different one of a plurality of odd addresses;
  said SIP memory means includes:
    an even SIP memory; and
    an odd SIP memory associated with said even directory memory and said odd directory memory respectively; and
  said RIP memory means includes:
    an even RIP memory; and
    an odd RIP memory associated with said even buffer memory and said odd buffer memory respectively.

20. A multiprocessing system comprising a plurality of data processing subsystems and at least one main memory subsystem coupled in common to an asynchronous system bus, each data processing subsystem including a plurality of processing units, each processing unit being operative to generate memory requests for data, each request including an address; and
  a pipelined cache memory subsystem coupled to each of said processing units for receiving said data requests, said cache subsystem comprising:
    input selection means for selecting a request address from one of said processing units subsystems during an allocated time slot interval;
    a first pipeline cache stage coupled to said input selection means, said pipeline stage including a directory store organized into a plurality of levels containing groups of storage locations, each location for storing said first address portion of a memory read request generated by one of said processing units during said allocated time slot interval and each different group of locations within said directory store levels being accessed by a different one of said second address portions;
    a second cache pipeline stage including a data store organized into the same number of levels of said groups of locations as in said directory store and each different group of locations within said data store levels being accessible by a different one of said second address portions during a succeeding time slot interval for transfer of the data contents to the requesting one of said processing units;
    read in process (RIP) memory means included in one of said first and second cache stages, said RIP memory means including a plurality of locations, each location being accessed by a different one of said second address portions;
    decode and control means coupled to said directory store, to said RIP memory means, and to said data store, said decode and control means being operative during a cache allocation cycle in response to each request received from one of said processing units for data not stored in said data store to generate signals for placing the location specified by said second address portion in said RIP memory means in a predetermined state for identifying the data store location which has been preallocated; and
    control means coupled to said RIP memory means and to said decode and control means, said control means being conditioned by said decode and control means during a cache update cycle corresponding to an unused allocated time slot interval to switch to said predetermined state when said RIP memory means signals that a portion of the contents of said data store location which has been preallocated is being updated to maintain coherency prior to the receipt of the requested data to be stored in the same data location and
    said control means being operative to selectively condition said data store for transferring the most recent version of said requested data to said requesting processing unit.

21. The multiprocessing system of claim 20 wherein said first stage further includes second half bus cycle in process (SIP) memory means including a plurality of locations, each location defined by a different one of said second address portions; and
  said decode and control means being coupled to said SIP memory means, said decode and control means being operative during said allocation cycle in response to said each request received from one of said plurality of processing units for data not stored in said data store to generate signals for placing the location in said SIP memory means specified by said second address portion in said predetermined state for identifying said data store location which has been preallocated and said decode and control means being operative in response to the contents of said location read out during a subsequent allocation cycle generated in response to a memory request from another one of said processing units to inhibit the transfer of data to said another processing unit from said preallocated location in cache store thereby maintaining data coherency between said plurality of processing units.

22. The cache subsystem of claim 21 wherein said signals from said decode and control means conditions said location in said SIP memory means specified by said second address portion of said cache address during said allocation cycle to store level number signals coded to specify the level in which said location has been preallocated together with a signal indicating that a memory read request is in process.

23. The cache subsystem of claim 22 wherein said decode and control means includes programmable logic array (PLA) circuit means coupled to said RIP memory means and to said means for generating, said PLA circuit means being operative upon detecting a match between said plurality of hit signals generated in response to said memory request from said another processing unit, said level number signals and said signal indicating that said memory read request is in process to generate an output hit control signal to inhibit said transfer of said data.

24. The cache subsystem of claim 20 wherein said RIP memory means is organized into the same number of levels of said groups of locations as in said directory store means, and each location containing at least one bit position, said signals conditioning said bit location specified by certain ones of said signals and said second address portion of said cache address during said allocation cycle to store a signal indicative of said predetermined state.

25. The cache subsystem of claim 24 wherein said decode and control means includes programmable logic array (PLA) circuit means coupled to said RIP memory means and to said means for generating, said PLA circuit means being operative in response to said plurality of hit signals to generate a plurality of hit number signals together with a hit signal for conditioning said RIP memory means to store said signal indicating said predetermined state and said RIP memory means during said update cycle being operative to read out said signal for switching said control means to said predetermined state.

26. The cache subsystem of claim 25 wherein said control means includes bistable means having an output coupled to said data store, a set input coupled to said RIP memory means for receiving said signal and a reset input coupled to said decode and control means, said decode and control means being operative to switch said bistable means to an initial state during said allocation cycle of operation for enabling said bistable means to be switched to said predetermined state in response to said signal during said update cycle.

27. The cache subsystem of claim 20 wherein said cache unit further includes FIFO listener means coupled to said system bus and to said first stage and to said decode and control means, said FIFO listener means being operative in response to each memory write request applied to said system bus by any other processing unit and acknowledged by said main memory, to store and subsequently present said first and second portions of said each memory write request to said directory store and to said RIP memory means during said update cycle for synchronizing the receipt of asynchronously generated requests from said bus with the cycling of said cache subsystem.

28. The cache subsystem of claim 20 wherein said directory store includes:
- an even directory memory having a plurality of locations for storing a plurality of even addresses; and
- an odd directory memory having a plurality of locations for storing a plurality of odd addresses; and wherein said buffer memory means includes:
- an even buffer memory having a plurality of storage locations associated with a different one of a plurality of even addresses; and
- an odd buffer memory having a plurality of storage locations associated with a different one of a plurality of odd addresses;

said SIP memory means includes:
- an even SIP memory; and
- an odd SIP memory associated with said even directory memory and said odd directory memory respectively; and said RIP memory means includes:
- an even RIP memory; and
- an odd RIP memory associated with said even buffer memory and said odd buffer memory respectively.

29. The cache unit of claim 1, 11 or 20 wherein said cache unit further includes FIFO listener means coupled to said system bus and to said first stage and to said decode and control means, said FIFO listener means being operative in response to each memory read request received from said processing unit for data not stored in said data store means by said processing unit and acknowledged by said main memory, to store and subsequently present said first and second portion of said each memory read request to said directory store means and to said RIP memory means during said cache allocate cycle thereby synchronizing the sequence of operations performed by said cache unit with said main memory.

* * * * *